(12) United States Patent
Bianchetti et al.

(10) Patent No.: US 9,030,987 B2
(45) Date of Patent: May 12, 2015

(54) SYSTEMS AND METHODS FOR TRANSMISSION OF UNINTERRUPTED RADIO, TELEVISION PROGRAMS AND ADDITIONAL DATA SERVICES THROUGH WIRELESS NETWORKS

(75) Inventors: Fosco Bianchetti, Carrara (IT); Ioannis Katsavounidis, Los Angeles, CA (US)

(73) Assignee: Fosco Bianchetti, Carrara (IT)

( * ) Notice: Subject to any disclaimer, the term of this patent is extended or adjusted under 35 U.S.C. 154(b) by 0 days.

(21) Appl. No.: 13/381,390

(22) PCT Filed: Jun. 30, 2010

(86) PCT No.: PCT/US2010/040627
§ 371 (c)(1),
(2), (4) Date: Dec. 29, 2011

(87) PCT Pub. No.: WO2011/002901
PCT Pub. Date: Jan. 6, 2011

(65) Prior Publication Data
US 2012/0099514 A1 Apr. 26, 2012

Related U.S. Application Data

(60) Provisional application No. 61/222,025, filed on Jun. 30, 2009.

(51) Int. Cl.
| | | |
|---|---|---|
| *H04H 20/71* | (2008.01) |
| *H04N 21/472* | (2011.01) |
| *H04L 29/06* | (2006.01) |
| *H04N 21/234* | (2011.01) |
| *H04N 21/414* | (2011.01) |
| *H04N 21/44* | (2011.01) |
| *H04N 21/61* | (2011.01) |
| *H04N 21/643* | (2011.01) |

(52) U.S. Cl.
CPC .......... *H04N 21/47202* (2013.01); *H04L 65/60* (2013.01); *H04N 21/23406* (2013.01); *H04N 21/41422* (2013.01); *H04N 21/44004* (2013.01); *H04N 21/6131* (2013.01); *H04N 21/64322* (2013.01)

(58) Field of Classification Search
CPC ... H04L 29/06027; H04L 12/58; H04L 65/60; H04L 65/608; H04L 29/06176; H04N 21/23406; H04N 21/23805; H04N 21/238; H04N 21/2401; H04N 21/64776; H04N 21/44004; H04N 21/47202; H04N 21/6131; H04N 21/64322
USPC ................. 370/216, 312, 322, 328, 352, 390; 455/410; 709/231, 232, 233, 234, 235, 709/236, 237; 714/748, 749
See application file for complete search history.

(56) References Cited

U.S. PATENT DOCUMENTS

| | | | | |
|---|---|---|---|---|
| 7,970,379 B2 * | 6/2011 | White et al. | ................... | 455/410 |
| 2004/0249969 A1 * | 12/2004 | Price | ............................. | 709/231 |
| 2005/0078698 A1 * | 4/2005 | Araya et al. | .................. | 370/432 |

*Primary Examiner* — Kwang B Yao
*Assistant Examiner* — Harun Chowdhury

(57) ABSTRACT

A method and system for In-Dash Multimedia Players or Portable Multmedia Players for automotive, aviation, boating, and personal use that, exploiting the services and capabilities of the Digital Wireless Network DWLN (107), such as 3G network, and buffering the live stream data on both the Server (101) and User Equipment (111), combines in a novel synergistic integration a suite of new and known features such as: immediate and uninterrupted listening/viewing of Live Streaming Media LSM (109) by the user with or without optimization of the data bandwidth, and the provision to customize the commercial messages according to the user location, and the capability of reporting the customer choices and habits, and the automatic deletion of LSM after the time-shift time to benefit from copyright agreements.

2 Claims, 9 Drawing Sheets

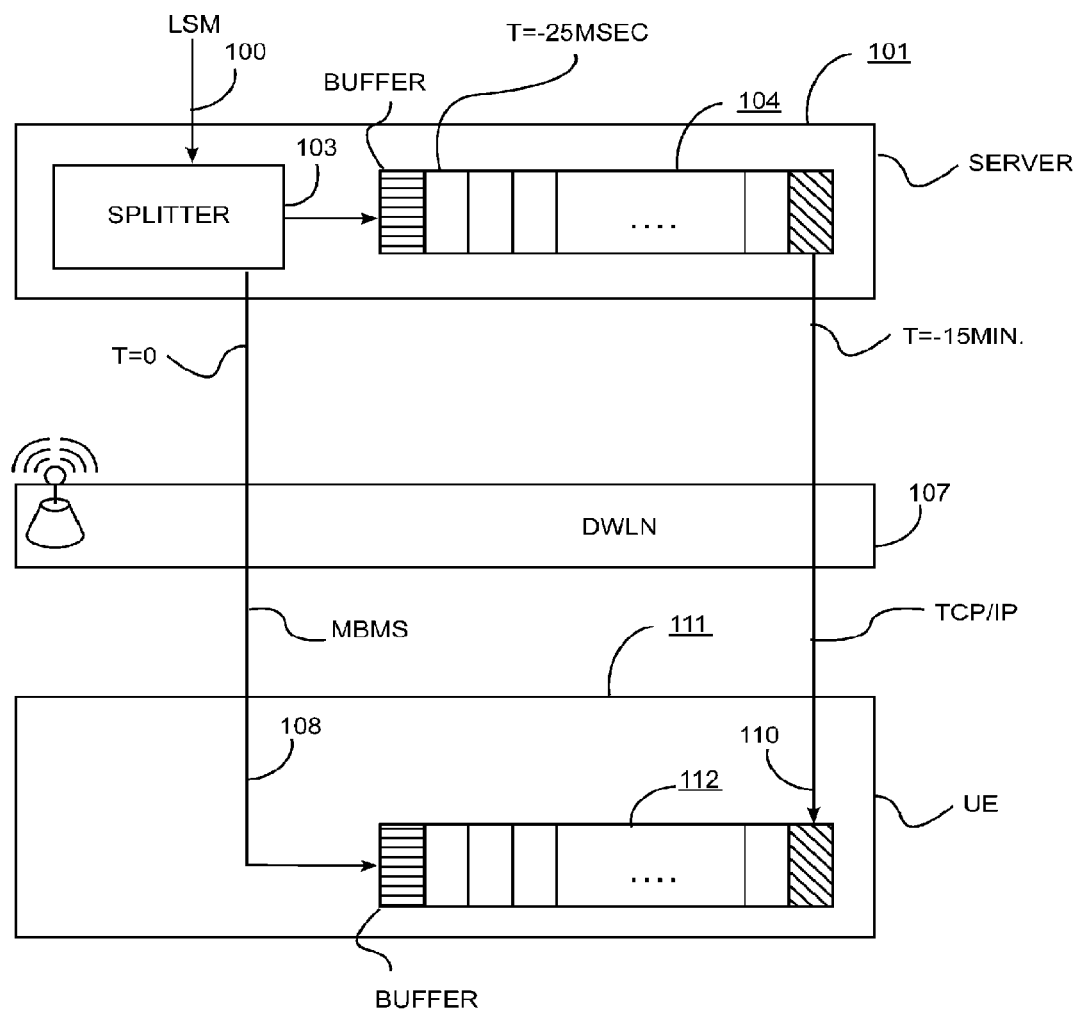
FIG.2.a

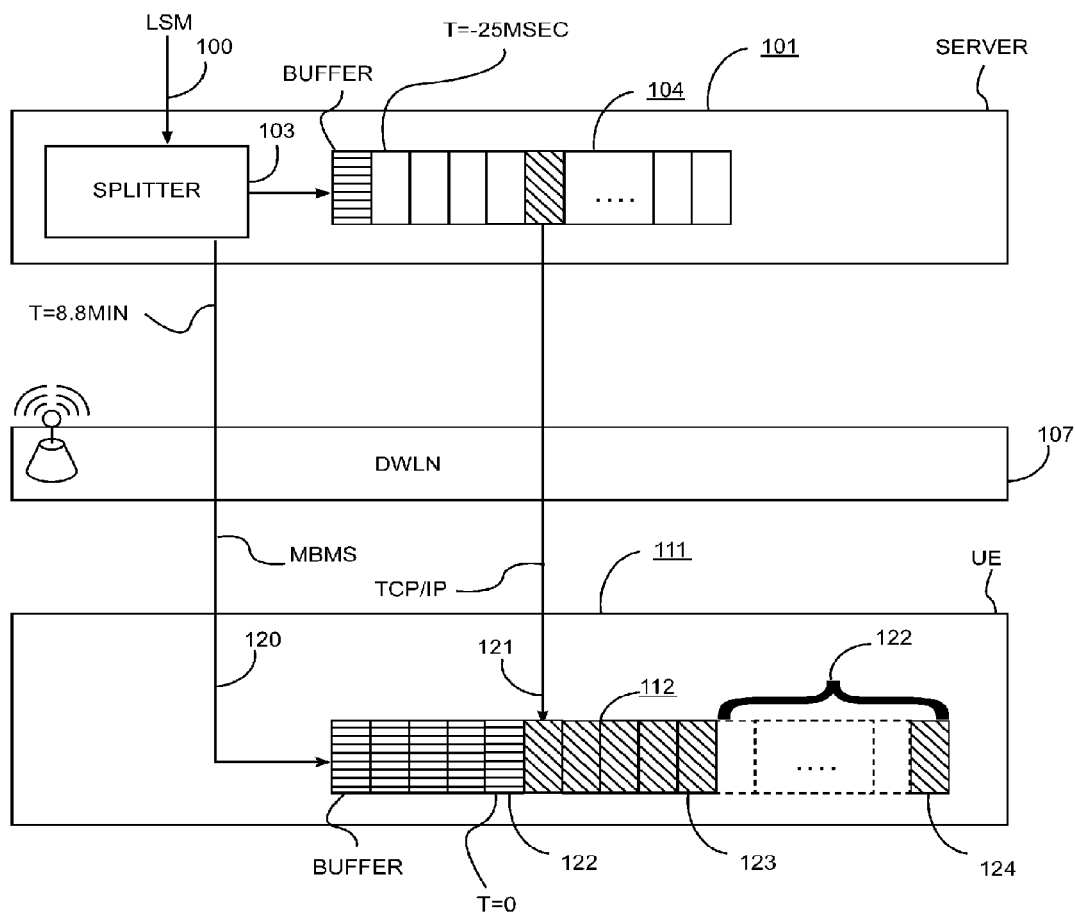

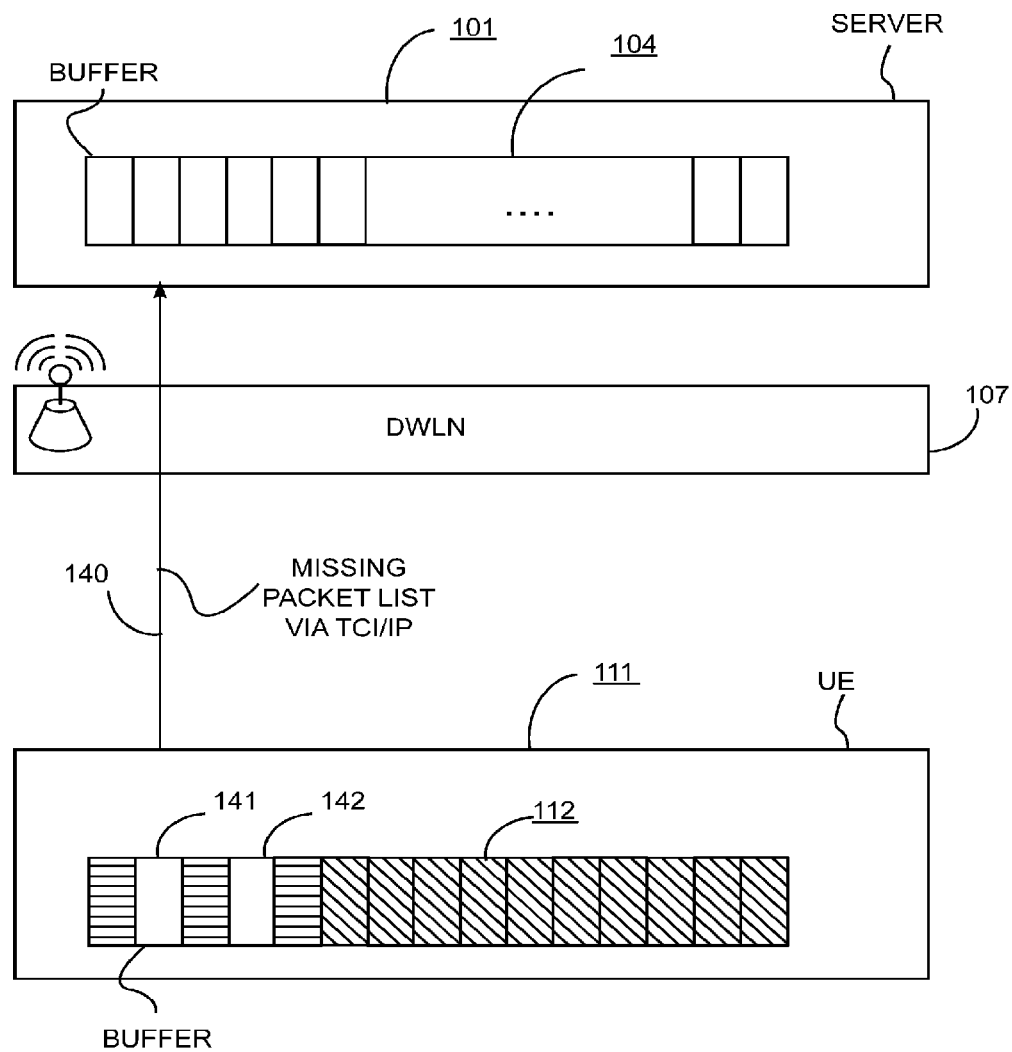

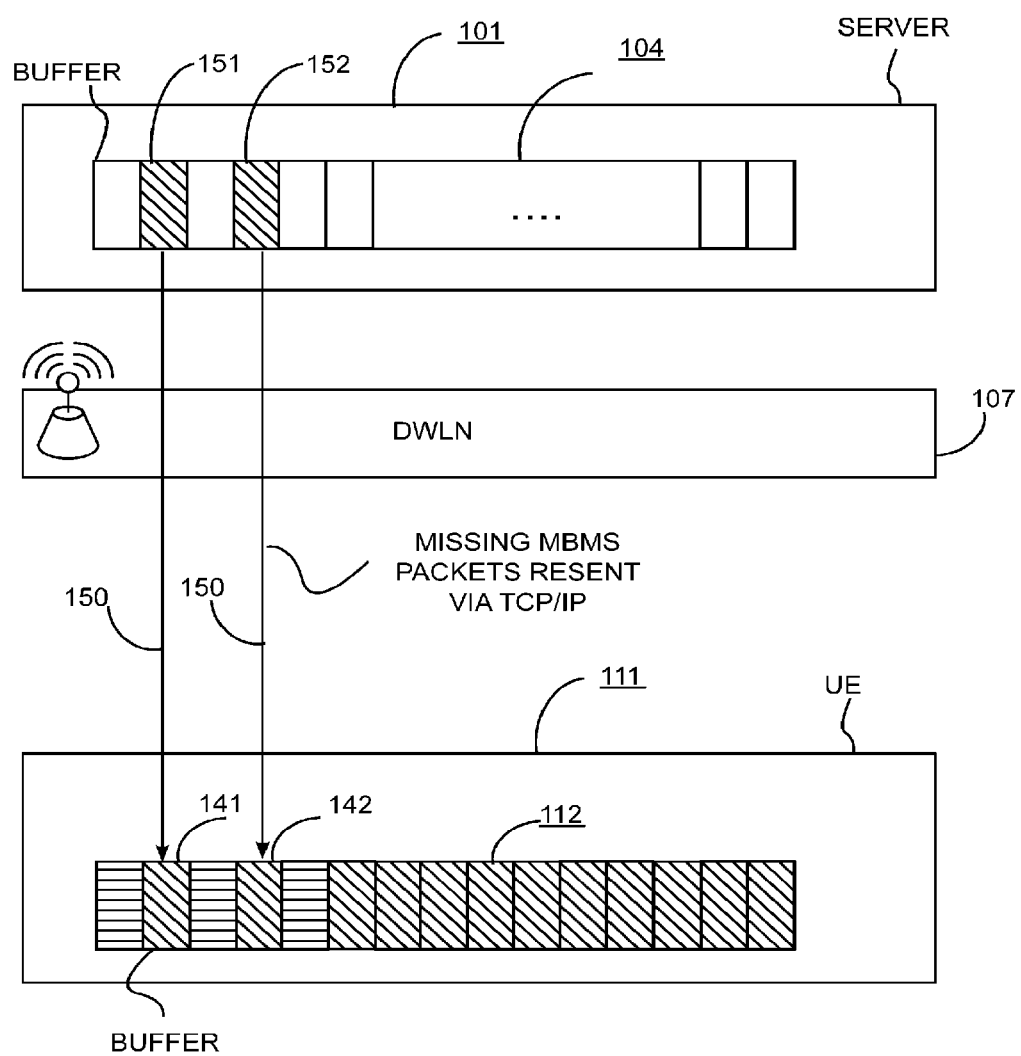

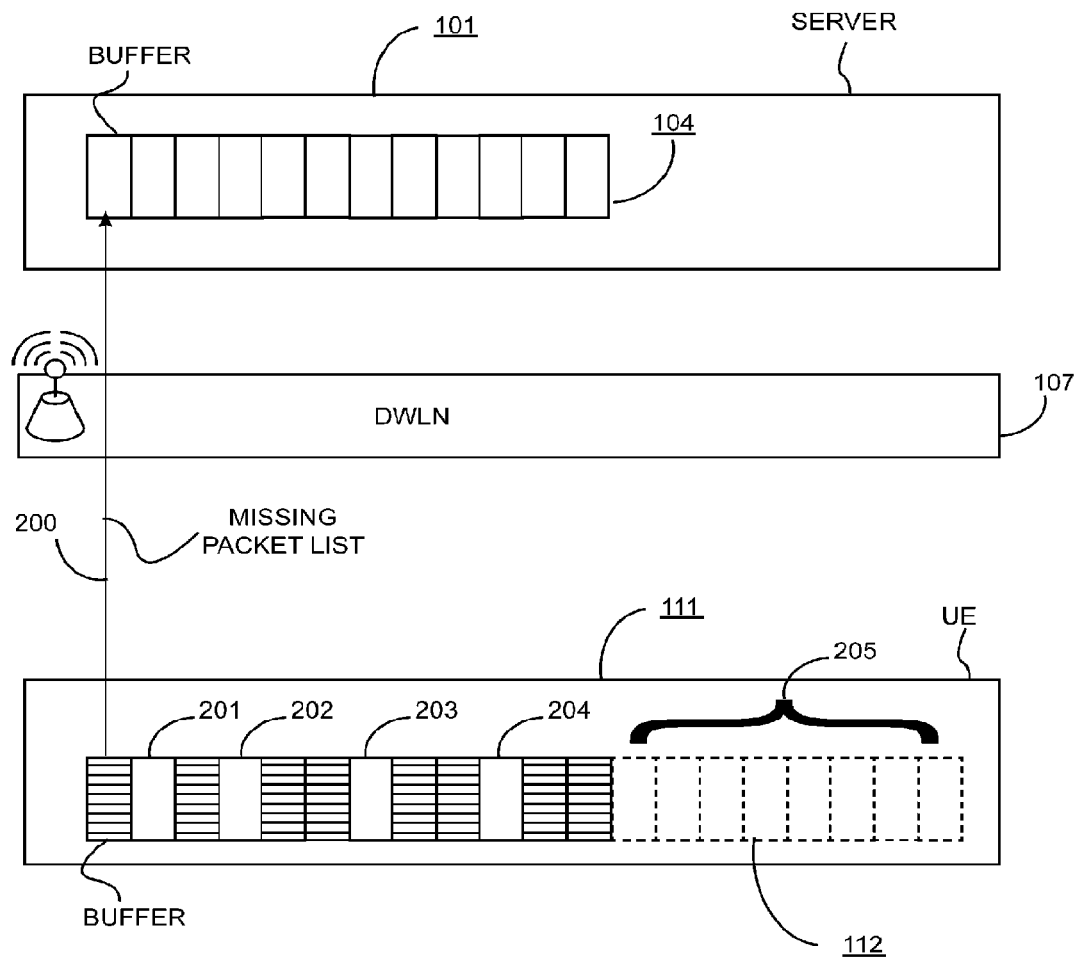

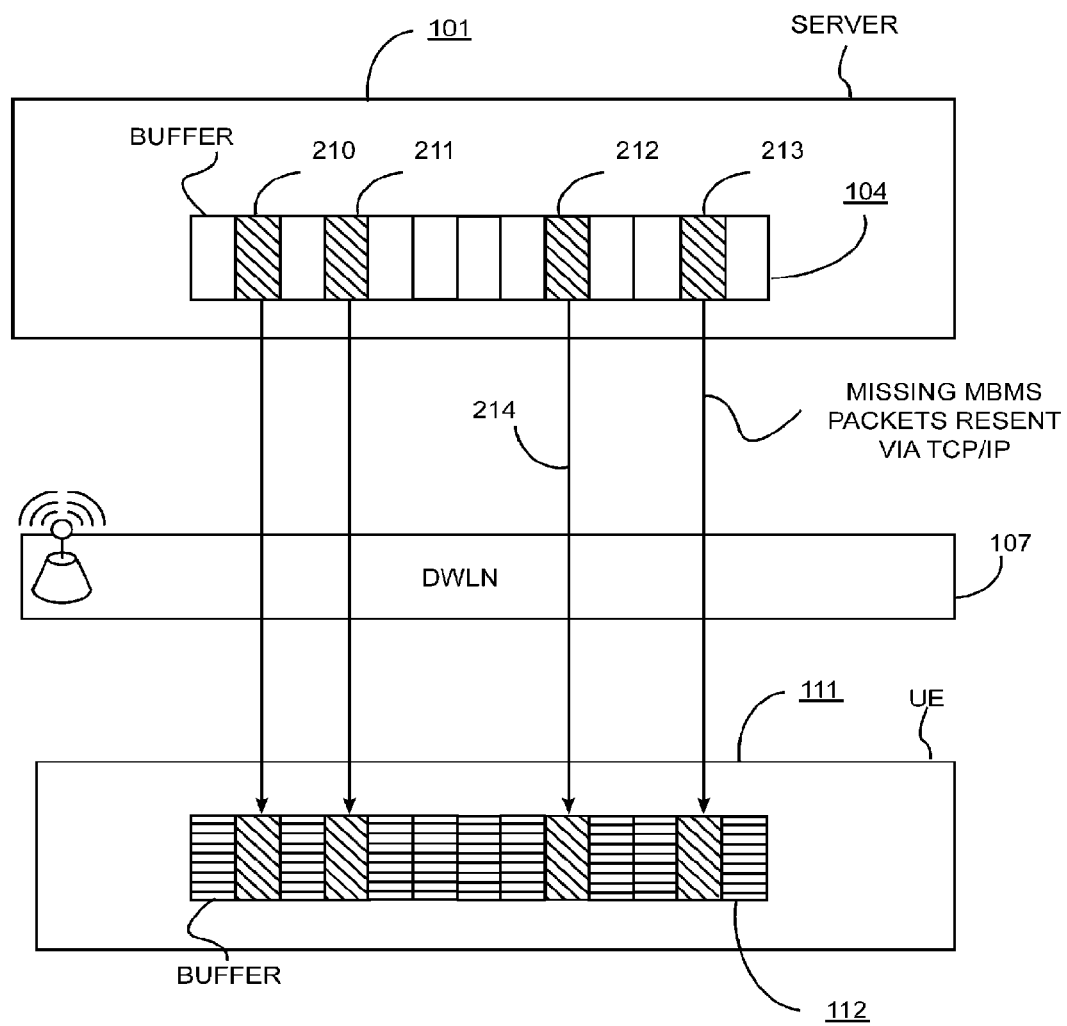

SYSTEMS AND METHODS FOR TRANSMISSION OF UNINTERRUPTED RADIO, TELEVISION PROGRAMS AND ADDITIONAL DATA SERVICES THROUGH WIRELESS NETWORKS

CROSS-REFERENCE TO RELATED APPLICATIONS

This application claims the benefit of provisional patent application Ser. No. 61/222,025, filed 2009 Jun. 30 by the present inventors, which is incorporated by reference.

DEFINITIONS

In-Dash Multimedia Player(s): an equipment(s) capable of playing multimedia content such as audio, video, images that is installed on the dashboard or mounted in other ways on a vehicle such as a car, a truck, a recreational vehicle.

Portable Multmedia Player(s): a portable equipment(s) such as a mobile phone, a personal navigator, a portable music player capable of playing multimedia content such as audio, video, images RF: Radio Frequency LSM: Live Streaming Media 109 is a content such as audio, video, data, streamed live by a source such as a radio station, a TV channel, a weather station and encoded in digital packetized form by an encoder/compressor.

DWLN: Digital WireLess Network 107 is a digital wireless network capable of high data rate transfer such as GPRS, EDGE, CDMA, UMTS, WCDMA, LTE, WiFi, WiMAX Server: an equipment or a combination of equipments capable of receiving multimedia data or content from a source having a real-time nature, such as a radio or TV and of encoding the content in LSM and of buffering the LSM and of connecting to DWLN and of communicating using optionally simultaneously different communication protocols such as TCP/IP or UDP or using different services such as MBMS optionally simultaneously with different communication protocols.

UE: an apparatus 111 that communicates with the DWLN and performs the buffering and multimedia playing at the user side or a combination of two or more apparatus, one which communicates with the DWLN and re-transmit or buffer and transmit the received data via a wired or a wireless communication such as BlueTooth to other apparatus which perform actions described in the embodiment.

MBMS: Multimedia Broadcast/Multicast Service 108 is a service including a communication protocol to allow the simultaneous reception of LSM by a plurality of UE.

TSSM: Time-Shift Stream Media 113 is LSM time-shifted for the total buffer duration that is the output of UE Dropout: short term interruptions of LSM signal Outage: long term interruptions of LSM signal OTOTM: a one to one transmission method that is able to transmit a LSM to a specified single UE. An example of OTOTM is the well-known TCP/IP reliable protocol that utilizes retransmission of packets that haven't been received after certain time and assures in-order reception of sequential sent data packets.

OTMTM: a one-to-many transmission method that is able to simultaneously transmit over the same bandwidth a LSM to a plurality of UE. An example of OTMTM is the well-known MBMS Multimedia Broadcast/Multicast Service (108).

TECHNICAL FIELD

The present invention relates to a method and a system for In-Dash Multimedia Players or Portable Multimedia Players for automotive, aviation, marine, and personal use; and more particularly, to a system for live wireless streaming of media, such as audio/video, to a multitude of In-Dash Multimedia Players.

BACKGROUND ART

The vast majority of vehicles currently in use incorporate vehicle communication systems for receiving signals. For example, vehicle audio systems provide information and entertainment to many motorists daily. These audio systems typically include an AM/FM radio receiver that receives radio frequency (RF) signals. These RF signals are then processed and rendered as audio output. Originally live multimedia content, such as real time audio/video, was delivered to In-Dash Multimedia Players by analog wireless modulation like FM radio or analog TV. These analog broadcast networks allow the use of only a limited number of channels, are subject to cross channel interference and have a poor signal quality. Satellite or ground based digital broadcast networks such as Digital Radio and Digital TV in various embodiments such as DAB, HD Radio, XM Radio, Sirius, Sat TV, DVB, DTT and DMB have removed or reduced these limitations using digital transmission in various forms and with various methods to deliver live streaming media (LSM) such as audio/video, but these systems do not have a provision to assure the continuity of reception when the vehicles moves into areas of signal obstruction or lack of coverage. As such areas can be quite large, or the vehicle can be in such areas for a long time (e.g. because of slow moving traffic in long tunnels, urban canyons, mountainous terrain), interruptions of the LSM can be quite long and annoying. Recently, digital wireless networks (DWLN) capable of high data rate transfers such as those found in later generation mobile telephony (e.g. GPRS, EDGE, CDMA, UMTS, WCDMA, LTE) or in Internet oriented cellular networks such as WiFi and WiMax have been widely deployed and are continuously expanding in coverage and data bandwidth. The DWLN can also be used to stream media such audio/video to a vehicle with protocols such as radio or video on Internet, but the DWLN are subjected to similar limitations of signal obstruction, or lack of coverage, as the other systems. The DWLN, differently from the digital and analog broadcast networks, provide a bidirectional communication with the users thus allowing the retransmission of missing data and also the introduction of functions that can relate the LSM to the specific user. For purposes of clarity within this document we refer to LSM, or live streaming media, as material that originates from a source having a real-time nature, such as a radio or TV broadcast. The LSM has as its source a system or arrangement that by definition can only be transmitted to users as fast as the material is generated; for example, a disk jockey speaking into a microphone. The two fundamental ways of transmitting LSM in digital form to the users are by: (i) the digital-broadcast networks such as used in Digital Radio and Digital TV where the same stream of data is transmitted in real time, generally with some degree of error correction, to all users that are able to tune-in and decode the signal, and (ii) the DWLN that can deliver media streams such as internet radio or internet TV to users that are connected to the network. One difference between the two types of transmission is that in the digital-broadcast networks the number of users is unlimited while in the DWLN the maximum number of users that can receive the LSM depends on the available data bandwidth, the requested quality of service, and the system and method used for the transmission. A live streaming multimedia service to in-car users via the DWLN is the focus of this patent application.

The DWLN are generally composed of a wireless segment such as an Access Network, and a land segment such as a Core Network, to connect the users to the source of the real time media. The LSM are generally transmitted over the DWLN using one or more protocols of the Internet Protocol Suite such as TCP or UDP or protocols specific to the DWLN such as described in the 3GPP or IMS specifications.

Today most Internet streamed audio and video are compressed to be listenable or viewable to less than 64,000 bits per second (bps) bandwidth and when the available bandwidth falls below the streaming bit rate the playback is interrupted. The nominal bandwidth of the DWLN is generally higher, such as from 200,000 to 7,000,000 bps, but the actual bandwidth can vary from 0 bps (i.e. the transmission is interrupted) to the nominal maximum bandwidth. The reductions of bandwidth can be of short duration (e.g. less than 100 sec) or long duration (e.g. between 100 sec and 15 minutes). The short duration reductions of bandwidth are caused by many factors such as congestion of the wireless or land segment of the network, interference and transmission quality issues. The long duration reductions of bandwidth are generally caused by problems in the wireless segment of the network such as obstructions, interference, cell changeover and distance from the transmitters. Depending on the used protocol the reduction of bandwidth can cause only a delay (e.g. as in TCP/IP protocol) or also a loss of data (e.g. in UDP/IP protocol). Each of these factors can cause delays and interruptions in the transmission of data thus preventing the user from being able to listen to or view uninterrupted LSM unless some special provisions have been incorporated. The short term interruptions are commonly referred to as 'dropouts', meaning that the data flow to the user has been shortly interrupted (i.e., the audio 'drops out'). Dropouts can be extremely annoying, for example, while listening to music. The long term interruptions are even more annoying and within this document we refer to them as outages. If a reliable protocol is used (e.g. TCP, SCTP) a common solution to the problem of dropout is to use a pre-buffering technique to store up enough audio or video data in the user device so that it can play the audio or video with continuity. When the user connects to the network, audio/video output at the user's system is delayed while the user's buffer is filled to a predetermined level. This process requires the user to wait until enough of the media file is buffered in memory before listening or viewing can begin. Typical pre-buffering wait times range from 10 to 30 seconds, determined by the vendor providing the audio or video media. This pre-buffering process avoids dropouts due to transmission delays shorter than the pre-buffering time, but it is not effective against loss of streaming data. In these systems the audio or video data is delivered from the source at the rate it is to be played out. If, for example, the user is listening to an audio stream encoded to be played-out at 24,000 bits per second, the source sends the audio data at the rate of 24,000 bits per second. Provided that the user waits 10 seconds, and the receipt of the buffering data has not been interrupted, there is enough media data stored in the buffer to play for 10 seconds. Cumulative delays in the receipt of audio/video data longer than 10 seconds cause the buffer to deplete. Because transmission of audio/video media data to the user takes place at the rate it is played out, the user's buffer level can never be increased or replenished while it is playing. This method can be applied only to dropouts and streaming media of limited duration, otherwise the size of the pre-buffer has to be increased and the time required to fill it would require the user to wait for an uncomfortable time. U.S. Pat. No. 7,716,358, to Price discloses a method and a system that exploits the fact that the data bandwidth of Internet is higher than the data bandwidth required by the streaming media. Price's patent uses a double buffer, one buffer at the source (e.g. in a server) and one buffer at the user, to eliminate the dropouts due to delays or loss of data without the need for an initial user wait time. This patent is focused on fixed Internet networks and does not consider issues typical of DWLN such as the bandwidth limitations related to the number of connected users in the mobile cell or the functions that relate to the specific users and their mobility.

Conventional streaming media systems may incorporate buffering systems for programmatic purposes. For example, the system may buffer media data at the server for the purpose of packet assembly or disassembly. Media data may also be buffered at the server to permit programming conveniences such as dealing with chunks of data of a specific size or offer time-shift functions to the user.

The sending of audio or video files via a network is known in the art. U.S. Pat. No. 6,029,194 to Tilt describes a media server for the distribution of audio/video over networks, in which retrieved media frames are transferred to a FIFO buffer. A clock rate for a local clock is adjusted according to the fullness of the buffer. The media frames from the buffer are sent in the form of data packets over the networks in response to interrupts generated by the local clock. In this manner, the timing for the media frames is controlled by the user to assure a continuous stream of video during editing. U.S. Pat. No. 6,014,706 to Cannon, et al. discloses an apparatus and method for displaying streamed digital video data on a client computer. The client computer is configured to receive the streamed digital video data from a server computer via a computer network. The streamed digital video data is transmitted from the server computer to the client computer as a stream of video frames. U.S. Pat. No. 6,002,720, to Yurt, et al. discloses a system of distributing video and/or audio information wherein digital signal processing is employed to achieve high rates of data compression. U.S. Pat. No. 5,923,655, to Veschi et al. discloses a system and method for communicating audio/video data in a packet-based computer network wherein transmission of data packets through the computer network requires variable periods of transmission time. U.S. Pat. No. 5,922,048 to Emura discloses a video server apparatus having a stream control section which determines a keyframe readout interval and a keyframe playback interval that satisfy a playback speed designated by a terminal apparatus. U.S. Pat. No. 6,014,694 to Aharoni, et al. discloses a system and method for adaptively transporting video over networks, including the Internet, wherein the available bandwidth varies with time. U.S. Pat. No. 6,378,035 to Parry et al. discloses a system and method for managing at the user end a buffer for streaming information. U.S. Pat. No. 7,280,662 to Walker et al. discloses a system to use a time shifting buffer to manage the availability of received data in a satellite-based digital audio radio. U.S. Pat. No. 6,034,746 to Desai et al. discloses a method and system to insert additional data such as commercials in a media stream. US Pat. Application No. US 2003/0139966 to Sirota et al. discloses a method for replacing pre-cached advertisement into a media stream. US Pat. Application No. US 2009/0260030 to Karlsson et al. discloses a mechanism to replace default advertisements with other advertisements in a media stream. US Pat. Application No. US 2005/0094815 to Walker et al. discloses various embodiments that manage the availability of a media stream in a time-shift buffer. US Pat. Application No. US 2008/0126420 to Wright et al. discloses systems and methods to meter media content presented on a wireless communication device. There remains a need in the art for a method and system for In-Dash Multimedia Players or Portable Multmedia Player for automotive, aviation, boating, and personal use that, exploiting the services and capabilities of the DWLN, such as 3G networks, and buffering the live stream data on both the both the transmitting and receiving ends, combines in a novel synergistic integration a suite of new and known features such as immediate and uninterrupted listening/viewing of live streaming media by the user with or without optimization of data bandwidth, and the provision to customize the commercial messages according to the user location, and the capability of reporting the customer choices and habits, and the automatic erase of the LSM after the time-shift time to benefit from copyright agreements.

SUMMARY OF INVENTION

For purposes of clarity within this document we refer to live streaming media (LSM) as material that originates from a source having a real-time nature, such as a radio or TV broadcast. We refer to digital wireless networks (DWLN) as networks such as found in cellular telephony of third-generation or later, WiFi and WiMAX networks, similar systems that provide a wireless bidirectional packetized communication with the user. We refer to user equipments (UE) as the apparatus that communicates with the network and performs the specified functions at the user side.

An embodiment of the present invention is a system and method for sending via digital wireless networks (DWLN) live streaming media (LSM), such as radio, television, information, to a plurality of In-Dash Multimedia Players that constitute the user equipment (UE) of this embodiment. The embodiment is conceived as a replacement of present in-dash AM/FM and satellite equipment providing higher quality while increasing the number of available stations and improving the continuity of service. Systems and methods to deliver LSM to UE over DWLN are described in prior art and already in commercial use, but the embodiment improves on the prior art by providing: immediate and uninterrupted playing of the LSM, and data bandwidth sharing of the wireless and land segment of the network by a plurality of UE thus increasing the network capacity, and location dependent customization of the live streaming media such as replacing non-local content of advertising with local content, and information to the source about the users habits such as that provided by a Portable People Meter, and prevention of storage of LSW so to be compliant with certain management-rights requirements. The present embodiment provides a system and method that integrating the above mentioned features and functions creates a new type of In-Dash Multimedia Player for vehicles. Generally stated, LSM in digital form can be delivered to the users by: (i) the digital-broadcast networks such as used in Digital Radio and Digital TV where the same digital signal is transmitted in real time to all UE that are able to tune-in and decode the signal, and (ii) the DWLN where the LSM is usually transmitted to each connected user as a separate digital signal. One difference between the two types of transmission is that in the digital-broadcast networks the number of users is unlimited while in the DWLN the maximum number of users that can receive the LSM depends on the available data bandwidth, the requested quality of service and the system and method used for the transmission. Digital-broadcast networks are used to deliver few LSM (hundreds) to many UE (millions) while DWLN can deliver a choice of many LSM (thousands) to few UE (hundreds) per area. The total number of serviceable UE depends on the number of areas in the network. The present embodiment exploits the DWLN using also an OTMTM service such as MBMS (Multimedia Broadcast/Multicast Service) to allow the simultaneous reception of a stream of packetized data by a plurality of UE within a particular cell or routing area to reduce the data bandwidth requirements thus increasing the maximum number of connected users within the area. This OTMTM stream from the server to the plurality of UE is unidirectional and transmitted over the DWLN at the data-rate required by the specific LSM. This service is then combined with a high data-rate bidirectional connection between each UE and the DWLN that, exploiting real-time time-shift based on a double buffering system, one buffer at the source or network node and one at the UE, provides immediate playback and uninterrupted service. This embodiment includes a provision to customize the advertising messages in function of the mobility of the vehicle and, as allowed by the law, the capability of reporting to the LSM providers customer selection choices and habits. The embodiment includes a feature that, by automatically erasing the LSM after the real-time time-shift time, mimics the characteristic of present in-dash AM/FM receivers to exploit the current copyright agreements of LSM providers based on the fact that the content is not stored in the equipment and cannot be replayed.

In another embodiment the user equipment (UE) is a personal portable device, such as a smart-phone, but all the functions of the first embodiment are maintained.

In another embodiment the user equipment (UE) and the functions are identical to the first embodiment apart from the possibility of independently disable: the provision to customize the messages, and the capability of reporting the customer choices and habits, and the automatic erase of the LSM after the time-shift time.

In another embodiment the user equipment (UE) is a personal portable device, such as a smart-phone, and the functions are identical to the first embodiment apart from the possibility of independently disable: the provision to customize the messages, and the capability of reporting the customer choices and habits, and the automatic erase of the LSM after the time-shift time.

BRIEF DESCRIPTION OF DRAWINGS

FIGS. 2.a-2.d are showing the initial Server/UE data flow and synchronization at different time instances.

FIG. 2.a is a diagram of the Server and UE buffers corresponding to T=0.

FIG. 2.b is a diagram corresponding to the time when the UE buffer is approximately full, which for the example presented happens at T=8.8 min.

FIG. 2.c is a diagram of the Server and UE buffers corresponding to the time after the UE inspects which packets are missing, which for the example presented happens at T=8.8 min+dt1, where dt1 is a very short time.

FIG. 2.d is a diagram of the Server and UE buffers corresponding to the time after the Server receives the list of missing packets from the UE, which for the example presented happens at T=8.8 min+dt1+dt2, where dt2 is a very short time.

FIGS. 3.a-3.b are showing subsequent, periodic Server/UE data flow and synchronizations, taking place at T=8.8 min+n*15 min, n=1, 2, . . . , i.e. at 23.8 min, 38.8 min, etc. since selecting a certain radio channel, at different time instances.

FIG. 3.a is a diagram of the Server and UE buffers corresponding to a time after approximately the duration of the UE buffer since the previous synchronization and after the UE inspects which packets are missing, which for the example presented is T=8.8 min+n*15 min+dt1.

FIG. 3.b is a diagram of the Server and UE buffers corresponding to a time after approximately the duration of the UE buffer since the previous synchronization and after the Server receives the list of missing packets from the UE, which for the example presented happens at T=8.8 min+n*15 min+dt1+ dt2.

DESCRIPTION OF EMBODIMENTS

Figure 4:
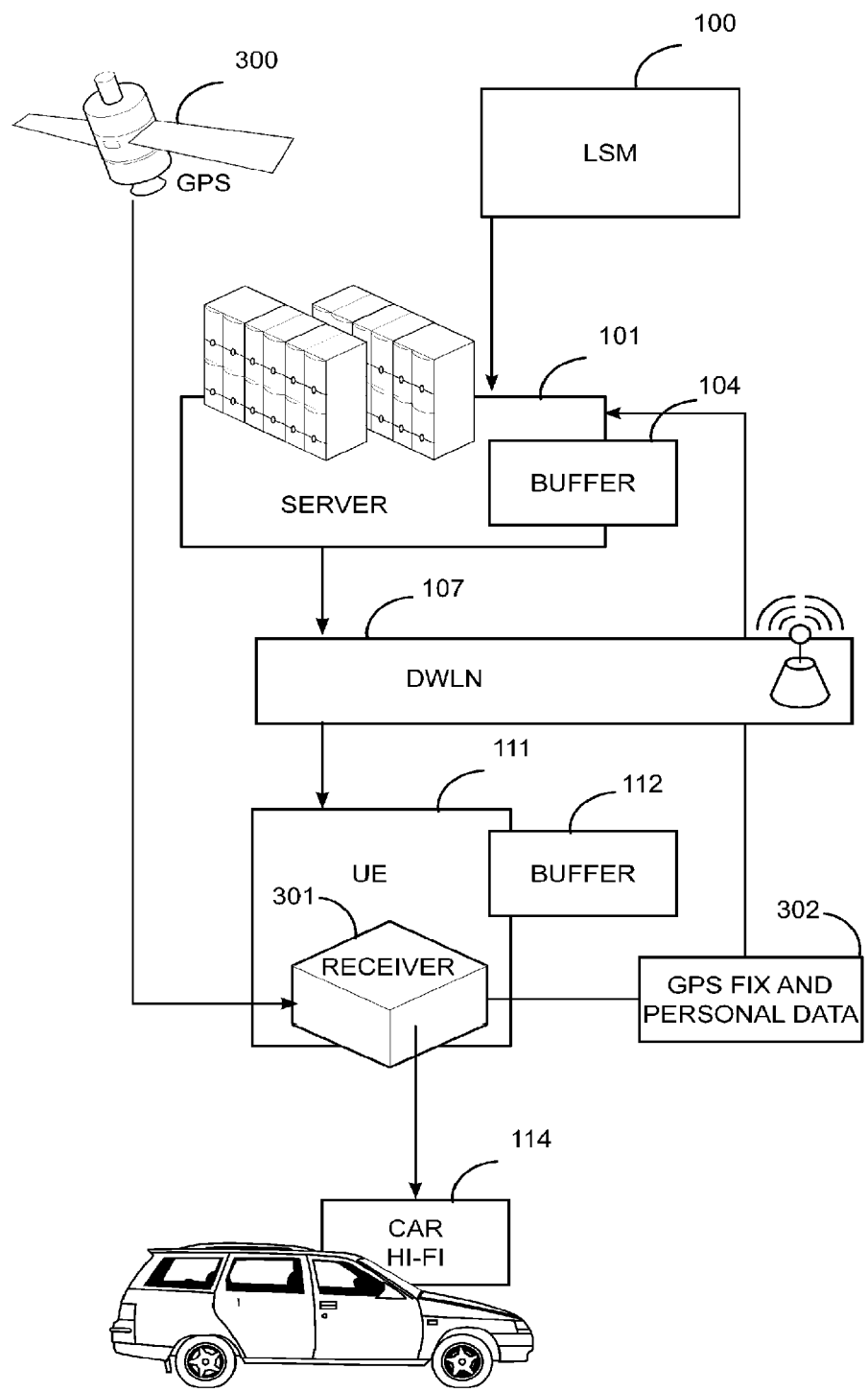
FIG. 4 is the first embodiment architecture
Figure 5:
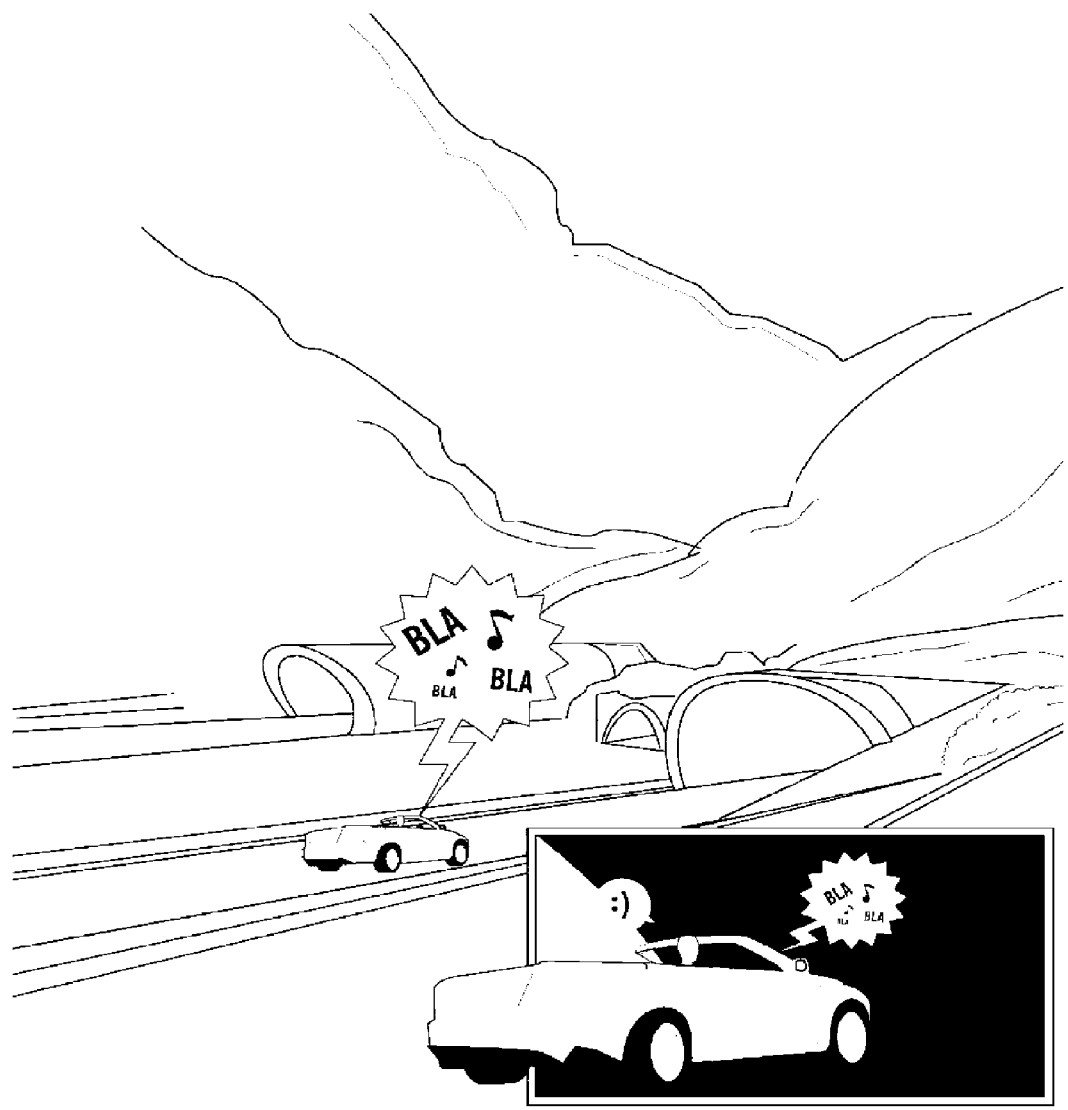
FIG. 5 is an example of application of the first embodiment

An embodiment of the present invention is a system and method for sending via digital wireless networks (DWLN) live streaming media (LSM), such as radio, television, information, to a plurality of In-Dash Multimedia Players that constitute the user equipment (UE) of this embodiment, FIG. 4. The embodiment is conceived as a replacement of present in-dash AM/FM and satellite equipment providing higher quality while increasing the number of available stations and improving the continuity of service. Systems and methods to deliver LSM to UE over DWLN are described in prior art and already in commercial use, but the embodiment improves on the prior art by providing: (i) immediate and uninterrupted playing of the LSM, and data bandwidth sharing of the wireless and land segment of the network by a plurality of UE thus increasing the network capacity, (ii) and location dependent customization of the live streaming media such as replacing non-local content of advertising with local content, (iii) and information to the source about the users habits such as that provided by a Portable People Meter, (iiii) and prevention of storage of LSW so to be compliant with certain management-rights requirements. The present embodiment provides a system and method that integrating the above mentioned features and functions creates a new type of In-Dash Multimedia Player.

Immediate and uninterrupted playing of the LSM.

Generally stated, LSM in digital form can be delivered to the users by: (a) the digital-broadcast networks such as used in Digital Radio and Digital TV where the same digital signal is transmitted in real time to all UE that are able to tune-in and decode the signal, and (b) the DWLN where the LSM is usually transmitted to each connected user as a separate digital signal. One difference between the two types of transmission is that in the digital-broadcast networks the number of users is unlimited while in the DWLN the maximum number of users that can receive the LSM depends on the available data bandwidth, the requested quality of service and the system and method used for the transmission. Digital-broadcast networks are used to deliver few LSM (hundreds) to many UE (millions) while DWLN can deliver a choice of many LSM (thousands) to few UE (hundreds) per area. The total number of serviceable UE depends on the number of areas in the network. The present embodiment exploits the DWLN using also an OTMTM service such as MBMS (Multimedia Broadcast/Multicast Service) to allow the simultaneous reception of a stream of packetized data by a plurality of UE within a particular cell or routing area to reduce the data bandwidth requirements thus increasing the maximum number of connected users within the area. This OTMTM stream from the server to the plurality of UE is unidirectional and transmitted over the DWLN at the data-rate required by the specific LSM. This service is then combined with a high data-rate bidirectional connection between each UE and the DWLN that, exploiting real-time time-shift based on a double buffering system, one buffer at the source or network node and one at the UE, provides immediate playback and uninterrupted service.

The above mentioned immediate playback and uninterrupted service is integrated in the present embodiment exploiting the above mentioned OTMTM functionalities according to the following detailed description.

LSM data rates can be very different according to the type of media and coding method. For the purpose of describing the present embodiment we assume a radio transmission at about 20,000 bps (20 kbps) Such choice is in no way limiting the scope of the presented method and greater or lower bitrates may be used. At the same time, we will assume a UMTS wireless cellular network, with only 54 kbps average bandwidth, although other networks of lesser or greater bandwidth may be used. This chosen bandwidth is unrealistically low, it is only provided to facilitate the calculation of this detailed description of the present embodiment. The systems and methods described herein can be utilized with other networks, although preferably the bandwidth of the selected network is many times higher than that of the LSM. Furthermore, as the present embodiment addresses not only the drop-outs, but also the outages, we will use as an example a buffer with a length of 15 minutes. Once again, such choice is not restricting the scope of the system and greater or smaller buffer delays may be used. The buffer delay is also referred to as buffer size, since data enter from one end of the buffer and exit from the other end, once the buffer is completely full (e.g. for circular buffer or FIFO buffer). So, in our example $$\text{buffer\_size}=15 \text{ min}$$

Once the user operates the UE to select a certain radio station to listen to, say at time $$t=0$$

, the system establishes two connections that are optionally substantially simultaneous between the Server and the UE. The first connection uses a OTOTM, such as TCP/IP while the second uses a bandwidth sharing OTMTM, such as MBMS. The two mentioned protocols are well known in the art, but other protocol with similar properties can be used.

The first connection (OTOTM) starts transferring the older (e.g. the oldest) available data in the Server's buffer as soon as the UE requests the reception of the LSM. In our example, that means that the first packets of the LSM transferred to the UE buffer are time-shifted with a delay of 15 minutes.

$$t(\text{TCP/IP\_start})=-15 \text{ min}$$

The second connection (OTMTM) is established by synchronizing on the packets of the existing real time OTMTM stream or causing the initiation of a real time OTMTM stream on which to synchronize. For purpose of clarity we note that the use of the OTMTM, such as MBMS or of a similar one, conceptually requires a plurality of connected UE, because it has the scope of saving bandwidth when more UE are connected and receiving the same LSM. With real time OTMTM protocol stream we describe a LSM that is traveling via OTMTM without any time-shift, that is a LSM only subject to network propagation delays.

The OTMTM data rate is obviously equal to that of the LSM, which in our example is $$\text{rate(OTMTM)}=20 \text{ kbps}$$

The data rate of the first connection (MBMS OTOTM) transmission is the remainder of the data bandwidth allowed by the wireless connection, which in our example is $$\text{rate(TCP/IP)}=54-20=34 \text{ kbps}$$

As such, the first (OTOTM) transmission will reach the starting point of the second (OTMTM) transmission in the approximate time of buffer_size·rate(OTMTM)/rate(OTOTM), which in our example is 15 min·20/34=8.8 min.

In this way, after 8.8 min since "tuning" to the radio station or other LSM source, the UE will have received 8.8+15=23 8 min of LSM, and since the first 8.8 min have already been "consumed" (=decoded by the UE to play to the user of our system), it means that in the UE buffer there are 15 min of available playing time. In this way, the UE can stay out of network coverage, but still be able to continuously play the SLM. Thus, for the user, reception of the selected station is uninterrupted, or appears to be continuously playing, regardless of the Dropouts or Outages of the DWLN, for a time duration related to the amount of buffered data.

After the UE has reached a certain fill stage, such as the point when the buffer is filled up to its full capacity (15 min. worth of radio programming, or 8.8 min since tuning to the desired radio station in our example), the UE inspects for any OTMTM data packets that are missing, something that can happen if there is no retransmission mechanism in OTMTM, such as in MBMS. To detect whether any data is missing, the present embodiment uses one of the many means known in the prior art such as checking the serial number, or other timing or sequence information, that is attached to any transferred data packet for synchronizing the LSM at the two ends of the connection. When there is a discontinuity in the packet serial number, it indicates missing data. The list of missing packets is communicated by the UE to the Server, using a secure (such as TCP/IP) connection and the Server substantially immediately starts resending these data to the UE using the OTOTM connection. Under normal network coverage, such retransmission is expected to generally last very short time (Dropouts) since it needs to cover only a few OTMTM packets that are missing. In case of an outage, the amount of missing data is expected to be significant. In the present embodiment the user, by a simple setting such as strong, medium, normal and automatic, has the possibility of defining the length of the buffer to different predefined values such as 15 min, 10 min and 5 min and to a dynamic length that is continuously updated on the basis of the Dropouts and Outages measured over a period of time. For the purpose of clarity we repeat that each setting trades the length of recoverable interruptions against the time-shift delay.

The amount of data that need to be transmitted using OTOTM, such as TCP/IP protocol, or similar, varies according to the amount of missing data, which is related to the amount of time that the UE suffers Dropouts and Outages. In the present embodiment, the vast majority of data is expected to be received through OTOTM, which offers better communication method from the point of view of data bandwidth and network utilization. Moreover, due to the random characteristics of the individual UE Dropouts and Outages, OTOTM traffic and number of connections is expected to be fairly balanced, further improving the DWLN bandwidth utilization.

Figure 1:
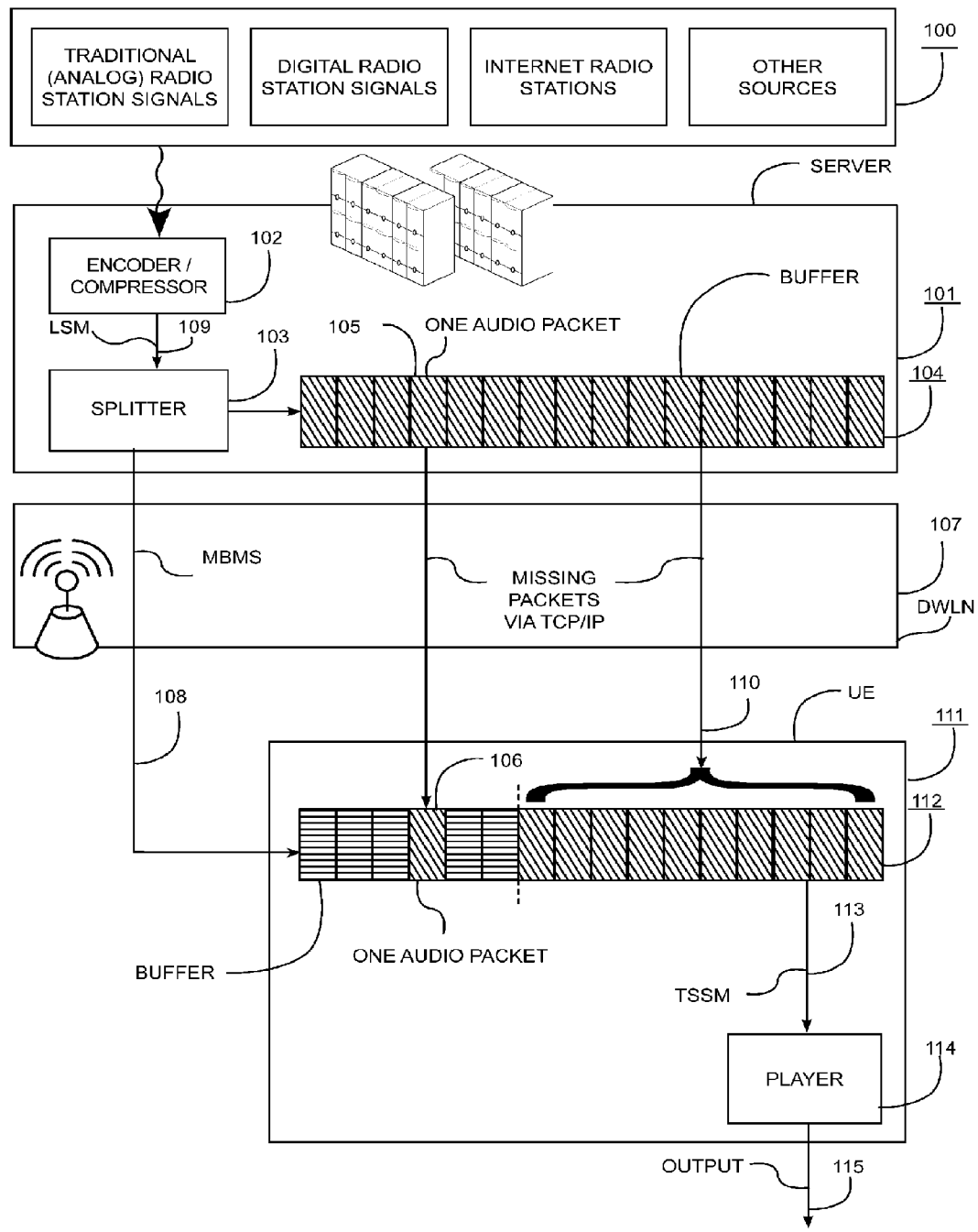
FIG. 1 is showing the overall system architecture

FIG. 1: Overall system architecture. Reference numeral (100) shows a plurality of media that includes groups of live signal receivers, such as traditional (analog, e.g. FM or AM) radio signals, digital radio e.g. HD-radio and DAB, station signals, internet station signals and other sources. The Server (101) has appropriate components to receive the above mentioned signals and includes a software or hardware component (102) and (103) that can compress and encode into a packetized live stream media (LSM) the received signals. One output of the splitter, component (103), is stored in the encoder buffer (104) which can be implemented as a solid-state or magnetic, or otherwise, while the other output is sent to the DWLN as an OTMTM, such as an MBMS. The buffer can be a circular buffer or a FIFO buffer or otherwise, as long as it allows for data of a certain duration (15 min. in the example presented) to be stored and new data overwrite older data. Each packet is assigned a unique sequence number or timestamp. The packets from this buffer are sent to the user equipment (UE) (111) through the DWLN (107) as OTMTM packets (108) or OTOTM packets (110).

The UE (111) has the appropriate hardware or software components, including optionally any antennas, cables or otherwise, to connect to the DWLN. Example such components (not shown) are SIM cards that allow a device to connect to a GSM/2.5/3G network. It also includes a buffer (112) capable of receiving OTMTM/OTOTM packets which provides temporary storage of such data. Reference number (106) shows one such packet stored in buffer (112). The structure of this buffer is a circular, FIFO or other buffer that allows a certain amount of data to be stored, and overwrites the oldest available data with new data. Such buffer is usually implemented as solid-state, magnetic, or otherwise. The next component that reads data from the UE buffer is a player (114). This component can be implemented in hardware, software or a combination of these. It can be easily implemented, in way of example, on an embedded computer. This component outputs a signal (115) suitable to drive standard multimedia equipments such as audio players, video players, amplifiers.

FIG. 2.a: Initial Server/UE data flow and synchronization @t=0 min. We show the Server side buffer (104), the UE buffer (112) and the DWLN (107), as previously discussed. At T=0, in response to a UE request (not shown) for a certain LSM; 2 packets, one using OTMTM (108) and one using OTOTM (110) are transmitted. The OTMTM packet has time stamp T=0 and the TCP/IP OTOTM packet has timestamp −15 sec. This parallel transmission continues for 8.8 minutes, with OTMTM packets filling the decoder buffer from the left and OTOTM packets filling the decoder buffer from the right.

FIG. 2.b: Server/UE data flow and synchronization @t=8.8 min. We show the Server side buffer (104), the UE buffer (112) and the DWLN (107) as previously discussed. At T=8.8 min, the Server sends the last fill-up OTOTM packet (T=−25 msec) (121) together with current (T=8.8 min) OTMTM packet (120) at which point UE's buffer is full. The UE has already received, decoded and played 8.8 min worth of OTOTM packets (122) shown in dashed boxes on the right of UE buffer. We show the position in the buffer of the first OTMTM packet (122), the first OTOTM packet sent (124) and also the packet sent through OTOTM that is now ready to be played at the end of the UE buffer (123) corresponding to approximately T=−6.2 min.

FIG. 2.c: Server/UE data flow and synchronization @generic time. We show the Server side buffer (104), the UE buffer (112) and the DWLN (107), as discussed previously. During the reception of OTMTM packets, the UE inspects and maintains a list of missing packets, determined on the basis of discontinuities (jumps) in packet sequence number. Packets (141) and (142) are missing (marked with white) and a list (140) is sent to the Server through a secure method, such as TCP/IP.

FIG. 2.*d*: Server/UE data flow and synchronization @ generic time. We show the Server side buffer (104), the UE buffer (112) and the DWLN (107), as discussed previously. Upon reception of the list of missing OTMTM packets the Server resends them via OTOTM packets (151) and (152) to replace the missing packets (141) and (142) of FIG. 2.*c*. At the end of retransmission (150), UE buffer is completely full with 15 min of audio data. As such UE can sustain an outage of DWLN of up to 15 minutes with no brake in playing of the LSM.

Location Dependent Customization of the Live Streaming Media

In the present embodiment a position determination means known in the art such as GPS receiver or a cell based triangulation is incorporated in the UE and provides the UE position to a LSM transit Server node of the DWLN that according to a specified logic based on the geographic area of the UE replaces at default message such as a commercial with another area-related predefined message using one of the methods and systems commercially available or disclosed in prior art such as US Pat. Application No. US 2009/0260030 to Karlsson et al., that describes a mechanism to replace default advertisements with other advertisements in a media stream.

Information to the Source about the Users' Habits

In the present embodiment the UE, in way compliant with the local privacy laws and regulations, incorporates a method to send to the source of the LSM, via the upstream DWLN functionality, information to perform statistical analysis of the LSM fruition time of the user to meter the effectiveness of advertisement. In the present embodiment, the UE sends via TCP/IP to the Server of the source, or some other specified Server, at predefined regular times, or upon request, a message with ID number of the specific LSM that is being played. The information is used for purposes such as advertising or program metering.

Prevention of Storage of LSM

In the present embodiment the UE has a provision to discard the played LSM at the output of the UE buffer and to prevent the user from accessing the LSM. In this way the UE behaves exactly as a classical AM/FM or TV receiver, apart from the time-shift functional to avoid the DWLN outages. In practice this provision of this embodiment creates an extension of the broadcasting sources, like a radio repeater, maintaining all the characteristic of the broadcast such as the volatility of the radio/video content, thus avoiding certain additional royalties such as the Performance Royalties applied to Internet and Sat radio in certain countries.

In another embodiment the user equipment (UE) is a personal portable device, such as a smart-phone, but all the functions of the first embodiment are maintained.

In another embodiment the user equipment (UE) and the functions are identical to the first embodiment apart from the possibility of independently disable: the provision to customize the messages, and the capability of reporting the customer choices and habits, and the automatic erase of the LSM after the time-shift time.

In another embodiment the user equipment (UE) is a personal portable device, such as a smart-phone, and the functions are identical to the first embodiment apart from the possibility of independently disable: the provision to customize the messages, and the capability of reporting the customer choices and habits, and the automatic erase of the LSM after the time-shift time.

The invention claimed is:

1. A method for optimizing the bandwidth by using at the same time in a cooperative way a one to many and a one to one transmission when sending packetized live streaming media information (LSM) over a digital wireless network (DWLN) comprising:
    a) a server encoding said information into a series of digital packetized data, or receiving said information in digital form and packetizing it, or receiving said information in digital packetized data,
    b) a user equipment (UE) receiving and decoding said digital packetized data into said live information,
    c) said DWLN transferring said digital packetized data from said server to said UE and requests and other control information and data from said UE to said server,
    d) a server buffer (SB) in said server orderly storing said digital packetized data,
    e) a receiving buffer (RB) in said UE storing said digital packetized data, received either in order or out-of-order,
    f) a controller in said server:
        I. transferring said digital packetized data into said SB, at a filling rate equal to LSM streaming rate, beginning in one or more free locations of said SB and filling said SB while said free locations are available and
            i. overwriting the oldest said digital packetized data when no more said free locations are available and
            ii. attaching a progressive serial number to the packets of said digital packetized data and
        II. continuously transferring said digital packetized data to said DWLN at said SB filling rate (SBFR), such that one packet of data is sent to said DWLN, simultaneously to each packet of data that is written to said SB, using a one to many transmission method (OTMTM) that allows reception with no handshake of the same data packet by more than one said UE and
        III. upon request of said UE, transferring at the highest possible speed from said SB said digital packetized data to said DWLN, using a one to one transmission method (OTOTM) that allows reliable reception of the data packet by only the UE that requested it, and
            i. at the first said request, according to said progressive serial number and
            ii. starting from the smallest said serial number of said SB and
            iii. stopping said transfer when the highest said serial number packet has been transferred or when the serial number packet that is being transferred has said progressive serial number that corresponds to a later time than the serial number of a packet transmitted via said OTMTM transmission and
            iv. at the following requests, according to the specific said progressive serial number as requested by said UE,
    g) in the UE, a receiver controller:
        I. sending to said server via said DWLN said first transfer request and
        II. joining said OTMTM multicast transmission, and
        III. receiving from said server, via said OTOTM, said series of digital packetized data and
            i. storing said digital packetized data into said RB and
            ii. filling said RB until free locations are available or the server has emptied said SB and
        IV. receiving from said Server, via said OTMTM, said series of digital packetized data and i. filling said RB with said series of digital packetized data received via said OTMTM irrespectively of said OTOTM transfer and ii. keeping filling said RB until free locations are available and iii. keeping feeding said RB overwriting the oldest said digital packetized data when no more said free locations are available and V. sending to said server via said DWLN further transfer requests of said specific progressive serial number packets as needed to keep the RB full with a non interrupted serial number series of non-defective packets and VI. continuously extracting from said RB said digital packetized data according to said progressive serial number at said SBFR, and VII. decoding said packets into said live information wherein feeding simultaneously said RB with said OTOTM stream together with said OTMTM stream provides the transmission bandwidth advantages of a one to many system while allowing a plurality of UE to play said LSM without short term interruptions (dropouts), long term interruptions (outages) and without an initial buffer filling delay at the establishment of the connection.

2. A method as recited by claim 1, wherein said UE permanently erases said receiving buffer after said LSM is available to the user for viewing or listening, thus protecting said LSM from being replayed.

* * * * *